Dec. 13, 1960
D. S. PECK
2,963,794
FUEL CONSUMPTION SCHEDULE SYSTEM
Filed April 30, 1957
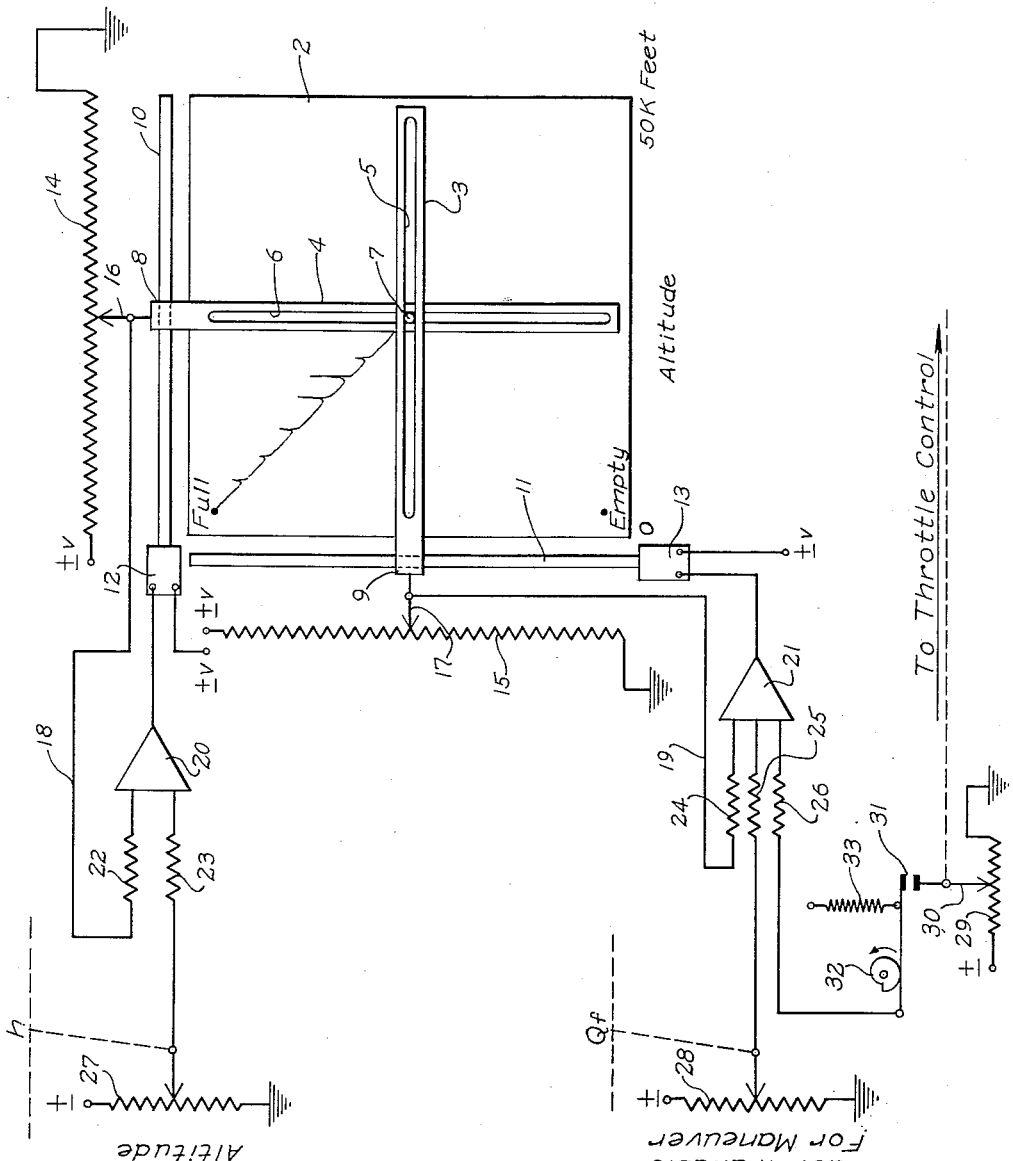
INVENTOR
Donald S. Peck
BY Donald P. Smith
ATTORNEY United States Patent Office 2,963,794
Patented Dec. 13, 1960

2,963,794

FUEL CONSUMPTION SCHEDULE SYSTEM

Donald S. Peck, Washington, D.C., assignor to ACF Industries, Incorporated, New York, N.Y., a corporation of New Jersey Filed Apr. 30, 1957, Ser. No. 656,048

3 Claims. (Cl. 35—12)

This invention relates to a recording apparatus and more particularly to a structure for reproducing a fuel expenditure characteristic in a training device during simulated climbing conditions.

A serious problem exists in the training of pilots who fly from aircraft carriers which consists of teaching the pilot to fly a particular climb schedule as assigned to the aircraft by its manufacturer. Usually the aircraft maker provides a climb schedule in the form of a plot of fuel against weight for a given altitude and air speed. This is prepared in the form of a chart, and a pilot knowing the gross weight of his vehicle and its altitude and desiring to reach a new altitude at a minimum expenditure of fuel with respect to distance will sight along guide lines on the chart, note the air speed at intermediate altitudes, fly these air speeds to the new altitude, and thereby complete the task under optimum conditions. The fuel consumption during a climb is predictable by the chart, providing the pilot has successfully maintained the air speed versus altitude schedule within a reasonable tolerance. If however, minimum elapsed time between altitudes is the desired condition, then another chart is usually provided for a change in power setting. Other performance charts are available to determine elapsed time and distance covered in a climb but these are considered somewhat secondary to the climb fuel vs. weight chart. Because of the unnecessary expenditure of fuel in reaching a desired altitude which follows from lack of use of the chart a pilot is frequently forced to return to the carrier to refuel, thus he is not able to complete the assigned mission on fuel available. This problem creates an ineffective tactic operation, endangers many lives, and reduces the overall strength of the air arm.

Summarily stated, this invention provides a scoring device to train and test a student pilot on his ability to fly predetermined optimum climb schedules in a simulated aircraft trainer. In use the invention takes the form of a plotting board having arms movable in two dimensions to form a visible trace which is representative of the fuel expended against altitude. An optimum trace may be placed on the board prior to the use thereof so that the instructor may check the student's performance against the desired characteristic. As an additional refinement a deriving structure feeds signals proportional to the throttle control into the plotting board to form indicia showing the position of the throttle superimposed upon the trace as formed.

It is accordingly a broad object of the invention to improve on the training devices now in use.

It is a more specific object of this invention to provide a simulated aircraft for training student pilots in the use of minimum fuel for a given climb.

It is a more distinct object of this invention to provide in a simulated aircraft training device a plotting board operable for forming a visible trace in accordance with a trainee's performance upon a particular problem.

Referring now to the drawing:

The single figure is a schematic view of a circuit and plotting board embodying the invention to be hereinafter described.

The invention will be more fully set forth in the following description referring to the accompanying drawing, and the features of novelty will be pointed out with particularity in the claims annexed to and forming a part of this specification.

There is shown in the drawing a plotting board having a recording surface 2 that is traversed by two arms 3 and 4, each comprising an elongated member having a longitudinal passage 5 and 6 respectively on the center lines thereof. It will be appreciated that the intersection of passages 5 and 6 forms a suitable area to receive a pen 7 or other stylus to make a visible trace on the recording surface 2. Motion of either of the arms in the respective X and Y dimensions will transport the pen 7 through the passage in the other respective arm and a two-dimensional representation is made upon the recording surface. For the purposes of this explanation let us assume that altitude is plotted on the abscissa from zero to 50,000 ft. and that fuel is plotted on the ordinate from empty to full. At the respective ends of arms 3 and 4 are journals 8 and 9 respectively having threaded ports therein to cooperate with elongated threaded shafts 10 and 11. A pair of motors 12 and 13 are coupled to rotate the shafts and it will be seen that energization and rotation of the motors will cause the several arms and their associated pen to move about the recording surface in any configuration. Motors 12 and 13 may be of any type but for this application it was found that a two-phase motor with one phase energized by a constant reference voltage and the other from the output of a summing amplifier at a phase angle of 90° from the reference voltage provides optimum performance. A pair of slide wire potentiometers 14 and 15 are disposed along the path of travel of the journal 8 and 9 and wipers 16 and 17 are provided to engage against the slide wires. The several wires are grounded at one end thereof and A.C. voltages are applied to the other ends of the slide wires. Connections 18 and 19 are provided between the wipers 16 and 17 and the motor input so that the motors function as follow-up devices, that is, the motor will operate until the answer voltage picked up at the slide wire neutralizes the input to thereby stop the motor.

A pair of summing amplifiers 20 and 21 have connected thereto balancing resistors 22 and 23 and 24, 25, and 26 respectively. This type of amplifier is well known and serves to add or subtract voltages applied to the input to thereby transmit a combined voltage to the input of the motor which will run or stop depending on the signal applied thereto in a well known manner.

A potentiometer 27 for deriving a voltage proportional to a simulated aircraft altitude is connected to resistor 23 to apply such voltage to the input of summing amplifier 20. This voltage may be derived in a manner similar to that shown in the patent to R. G. Stern et al., Ser. No. 2,724,192, and is available in a flight simulator. A potentiometer 28 deriving a voltage proportional to the simulated quantity of fuel aboard the aircraft applies a voltage to resistor 25 to the input of amplifier 21. This potentiometer represents the fuel available and may consist, for example, of a motor running at a predetermined rate depending upon the position of a throttle control and having a high gear reduction ratio whereby upon turning a predetermined number of shaft revolutions the potentiometer wiper will be moved to the position indicative of fuel, it being understood that the motor speed is made proportional to the position of the throttle. A third potentiometer 29 having a voltage impressed across its slide wire has a wiper 30 connected mechanically to the throttle control and a contact 31 mechanically opened and closed by a rotating cam 32 working against a tension spring 33 and connected to resistor 26 to apply the voltage derived into the input of amplifier 21. As will be seen the voltage applied at wiper 30 is a function of the position of the throttle, but cam 32 rotates at a constant angular velocity whereby the throttle position signal is added to the amplifier 21 periodically.

Operation

The instant device is utilized with the trainee seated at the simulated controls and an optimum characteristic fuel expenditure curve affixed to the plotting surface for the use of the instructor. The arms 4 and 5 will be together at a point to move the pen 7 into the upper left hand corner of the plotting board at the position of full fuel capacity and zero altitude. As the trainee maneuvers his simulated craft into a climbing attitude and attempts to follow the optimum climb as dictated by the manufacturer of the craft, signals from potentiometer 27 representing the altitude are applied through resistor 23 to summing amplifier 20. The output of amplifier 20 is impressed upon motor 12 to cause shaft 10 to rotate. As the arm 4 is moved in the X direction carrying pen 7 with it, wiper 16 moves along slide wire 14 until a voltage is impressed through conductor 18 and resistor 22 to amplifier 20 to balance the voltage from potentiometer 7 whereupon the motor 12 stops. Similarly voltage derived at potentiometer 28 indicative of fuel is transmitted through resistor 25 to amplifier 21 and is there impressed upon motor 13 which rotates shaft 11 moving arm 3 downward until wiper 17 picks up sufficient voltage from wire 15 to transmit the same to resistor 24 to balance the impressed voltage. It will be appreciated that there may be no time at which the motor stops but slow rotation may result during test, and a visible trace will be formed upon the display surface which will show the trainee's performance of fuel expenditure plotted against altitude. Shaft cam 32 is rotated by a synchronous motor thereby periodically closing contacts 31 which are opened in turn by spring 33. A voltage is derived at potentiometer 29 in accordance with the position of the throttle. This voltage is transmitted through wipers 30 to contact 31 and to resistor 26 into amplifier 21. It will be clear that periodically a comparatively large voltage appears at resistor 26 and thereby speeds up motor 13 to form a trace in the Y direction indicative of the throttle position whereby the instructor can determine just where the trainee has the control at any time.

At the conclusion of the training cycle the instructor will compare the student's performance against the optimum characteristic to thereby train pilots to achieve maximum altitude with a minimum of expenditure of fuel.

It should be understood that this invention is not limited to the specific details here shown and that changes and modifications may occur to those skilled in the art without departing from the spirit of the invention. For example, for the variables disclosed above there may be substituted such other parameters as fuel flow, air speed, altitude, and gross weight. Cruise control and other fuel management training devices to help instruct pilots on operating sequences of airplanes also come within the general scope and intent of the invention.

I claim:

1. A trace plotting apparatus for an aircraft trainer comprising in combination a plotting board, means including a pair of movable arms for making a trace on said board, driving means for each of said arms, first deriving means including an amplifier for producing a signal proportional to aircraft altitude, second deriving means including an amplifier for producing a signal proportional to aircraft fuel supply, circuit means connecting said first and second deriving means to the respective driving means, answer voltage generating means connected to each of said driving means, said generating means having its output connected to the input of the respective amplifier, means for superimposing on the trace representative of aircraft altitude and fuel supply an instantaneous indicia of throttle control position, said last named means having an output signal proportional to said throttle position and means for periodically connecting said output signal to the input of one of said amplifiers, and further including a potentiometer having a movable element driven by said throttle control so that its output signal is proportional to throttle position, and means periodically connecting said output signal to the input of one of said amplifiers.

2. Trace plotting apparatus for an aircraft trainer including a plotting board, board marking means movable with respect to said plotting board, first and second positioning means for moving said board marking means independently in two directions, first and second electrical control means, one for each of said marker positioning means responsive to separately received electrical signals, base signal deriving means for one of said two electrical control means for deriving a signal which is a function of simulated altitude of said aircraft trainer, base signal deriving means for the other of said two electrical control means for deriving a signal which is a function of simulated fuel supply on said aircraft trainer, signal deriving means for deriving a signal representative of the throttle position used in said aircraft trainer, and switching means for periodically superimposing said throttle position signal upon one of said base signals so as to momentarily displace said marking means in its respective coordinate direction a distance proportional to said throttle position.

3. Trace plotting apparatus for an aircraft trainer including a plotting board, board marking means movable with respect to said plotting board, first and second positioning means for locating said board marking means independently in Cartesian coordinates, first and second electrical control means, one for each of said marker positioning means for causing marker displacement proportional to separately received electrical signals, base signal deriving means for one of said two electrical control means for deriving a signal which is a function of simulated altitude of said aircraft trainer, base signal deriving means for the other of said two electrical control means for deriving a signal which is a function of simulated fuel supply on said aircraft trainer, signal deriving means for deriving a signal representative of the throttle position used in said aircraft trainer, and switching means for intermittently superimposing said throttle position signal upon one of said base signals so as to momentarily displace said marking means from its position representative of altitude and fuel supply a distance proportional to said throttle position.

References Cited in the file of this patent
UNITED STATES PATENTS

| | | |
|---|---|---|
| 2,388,105 | Wilson | Oct. 30, 1945 |
| 2,560,523 | Delmel | July 10, 1951 |
| 2,560,528 | Delmel | July 10, 1951 |
| 2,712,694 | Herbold | July 12, 1955 |
| 2,714,047 | Delmel | July 26, 1955 |
| 2,788,589 | Stern | Apr. 16, 1957 |
| 2,796,681 | Ringham et al. | June 25, 1957 |
| 2,829,446 | Cutler et al. | Apr. 8, 1958 |
| 2,853,800 | Cutler | Sept. 30, 1958 |
| 2,857,234 | Murray | Oct. 21, 1958 |